(12) United States Patent
Tong et al.

(10) Patent No.: US 10,884,270 B2
(45) Date of Patent: Jan. 5, 2021

(54) METHOD AND APPARATUS FOR COMPENSATING DATA VOLTAGES FOR LIQUID CRYSTAL DISPLAY PANEL

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Jie Tong, Beijing (CN); Xuelu Wang, Beijing (CN); Yan Wang, Beijing (CN); Dongdong Song, Beijing (CN); Peimao Li, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 107 days.

(21) Appl. No.: 15/991,447

(22) Filed: May 29, 2018

(65) Prior Publication Data
US 2019/0064567 A1 Feb. 28, 2019

(30) Foreign Application Priority Data
Aug. 31, 2017 (CN) .......................... 2017 1 0774154

(51) Int. Cl.
*G02F 1/133* (2006.01)
*G02F 1/1343* (2006.01)
(Continued)

(52) U.S. Cl.
CPC ........ *G02F 1/13306* (2013.01); *G02F 1/1309* (2013.01); *G02F 1/134309* (2013.01);
(Continued)

(58) Field of Classification Search
USPC .......................................................... 345/87
See application file for complete search history.

(56) References Cited

U.S. PATENT DOCUMENTS

2006/0109391 A1* 5/2006 Huitema .............. G09G 3/3611
349/19
2009/0040167 A1* 2/2009 Sun ...................... G09G 3/3696
345/99

(Continued)

OTHER PUBLICATIONS

Qungang MA, Principle and Design of TFT-LCDs, Dec. 1, 2011, p. 167, Publishing house of electronics industry, China.
(Continued)

*Primary Examiner* — Lunyi Lao
*Assistant Examiner* — Jonathan G Cooper
(74) *Attorney, Agent, or Firm* — Calfee, Halter & Griswold LLP

(57) ABSTRACT

A method for determining compensating data voltages for a liquid crystal display panel. The liquid crystal display panel includes a liquid crystal cell defined by a first substrate and a second substrate arranged opposite to each other. The liquid crystal cell has non-uniform cell gaps across the cell. The method includes: measuring a capacitance distribution across the liquid crystal cell; determining a cell gap distribution across the cell based on the capacitance distribution; and deriving, from the cell gap distribution, respective compensation voltages for different data voltages for each of different regions of the liquid crystal cell.

16 Claims, 5 Drawing Sheets

(51) Int. Cl.
*G09G 3/36* (2006.01)
*G02F 1/1362* (2006.01)
*G02F 1/13* (2006.01)

(52) U.S. Cl.
CPC ..... *G02F 1/136286* (2013.01); *G09G 3/3685* (2013.01); *G09G 3/3696* (2013.01); *G09G 2310/0264* (2013.01); *G09G 2320/0233* (2013.01); *G09G 2320/0693* (2013.01); *G09G 2380/02* (2013.01)

(56) References Cited

U.S. PATENT DOCUMENTS

| 2012/0169720 | A1* | 7/2012 | Moh | G09G 3/36 |
| | | | | 345/419 |
| 2015/0192809 | A1* | 7/2015 | Kim | G02F 1/133371 |
| | | | | 349/160 |
| 2015/0277640 | A1* | 10/2015 | Wu | G06F 3/0412 |
| | | | | 345/174 |

OTHER PUBLICATIONS

Yaxiang Dai, and Minbo Tian, Design and Operation of TFT LCD Panels, Nov. 30, 2008, p. 15, Publishing house of Tsinghua university, China.

\* cited by examiner

METHOD AND APPARATUS FOR COMPENSATING DATA VOLTAGES FOR LIQUID CRYSTAL DISPLAY PANEL

CROSS-REFERENCE TO RELATED APPLICATIONS

This application claims the benefit of Chinese Patent Application No. 201710774154.X filed on Aug. 31, 2017, the entire disclosure of which is incorporated herein by reference.

TECHNICAL FIELD

The present disclosure relates to the field of display technology, and particularly to a method and apparatus for compensating data voltages for a liquid crystal display panel.

BACKGROUND

Various flexible displays and curved display devices have been developed, among which, liquid crystal displays (LCDs) have many advantages over organic light emitting diode (OLED) displays, including high yield, low cost, good reliability, and the like.

In a flexible or curved LCD display, post spacers that are distributed across the display may be subjected to non-uniform deformation due to the uneven force withstood. This may result in a flow of the liquid crystal in the liquid crystal cell of the display, and hence varied cell gaps of the liquid crystal cell from one position on the display to another. FIG. 1 illustrates a cross-sectional view of a typical curved LCD 100 including a liquid crystal cell including an array substrate 101, an opposite substrate 102, a liquid crystal layer 103 sandwiched between the array substrate 101 and the opposite substrate 102, and a plurality of post spacers 104 extending from the array substrate 101 to the opposite substrate 102. As shown in FIG. 1, the liquid crystal cell is subjected to a pressing force at its central portion (e.g., position A), and the cell gap at position A is $d_1$. The liquid crystal in the liquid crystal layer 103 is pressed toward the peripheral portion (e.g., position B) of the liquid crystal cell, and the cell gap at position B is $d_2$. It is clear from FIG. 1 that $d_2$ is greater than $d_1$. That is, the curved LCD 100 has non-uniform cell gaps.

SUMMARY

It would be advantageous to provide a mechanism that can alleviate, mitigate or eliminate one or more of the above problems.

According to an aspect of the present disclosure, a method is provided for compensating data voltages for a liquid crystal display panel. The liquid crystal display panel comprises a liquid crystal cell defined by a first substrate and a second substrate arranged opposite to each other. The liquid crystal cell has non-uniform cell gaps across the liquid crystal cell. The method comprises: measuring a capacitance distribution across the liquid crystal cell, the capacitance distribution indicating respective capacitances presented by the liquid crystal cell at different regions of the liquid crystal cell; determining a cell gap distribution across the liquid crystal cell based on the capacitance distribution, the cell gap distribution indicating respective cell gaps of the liquid crystal cell at the different regions; and deriving, from the cell gap distribution, respective compensation voltages for different data voltages for each of the different regions, the compensation voltages being such that the liquid crystal cell has substantially a same transmittance at the different regions for a same data voltage.

In some embodiments, the measuring comprises: arranging an array of first electrode blocks across a first surface of the first substrate facing away from inside of the liquid crystal cell; arranging an array of second electrode blocks across a second surface of the second substrate facing away from the inside of the liquid crystal cell, the first and second electrode blocks forming respective plate capacitors at the different regions; and measuring capacitances of the respective plate capacitors to obtain the capacitance distribution.

In some embodiments, the array of first electrode blocks and the array of second electrode blocks have a same pattern, and the first and second electrode blocks are arranged to coincide with each other in a thickness direction of the liquid crystal cell.

In some embodiments, the determining the cell gap distribution comprises determining the respective cell gaps at the different regions from the following equation:

$$d_i = \frac{\varepsilon_r S_i}{4\pi k C_i} - d_g,$$

where $d_i$ represents the cell gap at an i-th one of the regions, i is a natural number, $\varepsilon_r$ represents a permittivity, $S_i$ represents an overlap area of the first and second electrode blocks of the plate capacitor at the i-th region, k represents an electrostatic force constant, $C_i$ represents the capacitance of the plate capacitor at the i-th region, and $d_g$ represents a sum of thicknesses of the first and second substrates.

In some embodiments, the deriving the compensation voltages comprises: a) acquiring functional relationships between the transmittance and the data voltage at the respective cell gaps; b) with reference to the functional relationship at a specific one of the respective cell gaps, deriving from the functional relationships a data voltage corresponding to a specific transmittance at the specific cell gap and data voltages corresponding to the specific transmittance at remaining ones of the cell gaps; c) calculating respective changes in the data voltages at the remaining cell gaps relative to the data voltage at the specific cell gap as respective compensation voltages for the data voltages at the remaining cell gaps; and d) repeating b) and c) to derive respective compensation voltages for the data voltages at the remaining cell gaps for various specific transmittances.

In some embodiments, the specific cell gap is a smallest one of the respective cell gaps.

In some embodiments, the method further comprises establishing a lookup table that defines a correspondence between the different regions, the different data voltages, and the derived compensation voltages.

In some embodiments, the method further comprises transmitting the lookup table to the liquid crystal display panel for use.

According to another aspect of the present disclosure, an apparatus is provided for compensating data voltages for a liquid crystal display panel. The liquid crystal display panel comprises a liquid crystal cell defined by a first substrate and a second substrate arranged opposite to each other. The liquid crystal cell has non-uniform cell gaps across the liquid crystal cell. The device comprises: an input module configured to receive a capacitance distribution across the liquid crystal cell, the capacitance distribution indicating respective capacitances presented by the liquid crystal cell at different regions of the liquid crystal cell; a cell gap distribution determination module configured to determine a cell gap distribution across the liquid crystal cell based on the capacitance distribution, the cell gap distribution indicating respective cell gaps of the liquid crystal cell at the different regions; and a compensation voltage derivation module configured to derive, from the cell gap distribution, respective compensation voltages for different data voltages for each of the different regions, the compensation voltages being such that the liquid crystal cell has substantially a same transmittance at the different regions for a same data voltage.

In some embodiments, the liquid crystal display panel further comprises an array of first electrode blocks arranged across a first surface of the first substrate facing away from inside of the liquid crystal cell and an array of second electrode blocks arranged across a second surface of the second substrate facing away from the inside of the liquid crystal cell. The first and second electrode blocks form respective plate capacitors at the different regions. The capacitance distribution is obtained by measuring capacitances of the respective plate capacitors at the different regions. The cell gap distribution determination module is further configured to determine the respective cell gaps at the different regions from the following equation:

$$d_i = \frac{\varepsilon_r S_i}{4\pi k C_i} - d_g,$$

where $d_i$ represents the cell gap at an i-th one of the regions, i is a natural number, $\varepsilon_r$ represents a permittivity, $S_i$ represents an overlap area of the first and second electrode blocks of the plate capacitor at the i-th region, k represents an electrostatic force constant, $C_i$ represents the capacitance of the plate capacitor at the i-th region, and $d_g$ represents a sum of thicknesses of the first and second substrates.

In some embodiments, the compensation voltage derivation module is further configured to: a) acquire functional relationships between the transmittance and the data voltage at the respective cell gaps; b) with reference to the functional relationship at a specific one of the respective cell gaps, derive from the functional relationships a data voltage corresponding to a specific transmittance at the specific cell gap and data voltages corresponding to the specific transmittance at remaining ones of the cell gaps; c) calculate respective changes in the data voltages at the remaining cell gaps relative to the data voltage at the specific cell gap as respective compensation voltages for the data voltages at the remaining cell gaps; and d) repeat b) and c) to derive respective compensation voltages for the data voltages at the remaining cell gaps for various specific transmittances.

In some embodiments, the specific cell gap is a smallest one of the respective cell gaps.

In some embodiments, the compensation voltage derivation module is further configured to establish a lookup table that defines a correspondence between the different regions, the different data voltages, and the derived compensation voltages.

In some embodiments, the liquid crystal display panel further comprises a timing controller configured to compensate the data voltages with the derived compensation voltages and a non-volatile memory accessible by the timing controller. The apparatus further comprises an output module configured to transmit the lookup table to the non-volatile memory for use by the timing controller.

According to yet another aspect of the present disclosure, a system is provided for compensating data voltages for a liquid crystal display panel. The liquid crystal display panel comprises a liquid crystal cell defined by a first substrate and a second substrate arranged opposite to each other. The liquid crystal cell has non-uniform cell gaps across the liquid crystal cell. The system comprises: a capacitance meter configured to measure a capacitance distribution across the liquid crystal cell, the capacitance distribution indicating respective capacitances presented by the liquid crystal cell at different regions of the liquid crystal cell; and an apparatus comprising: an input module configured to receive the capacitance distribution; a cell gap distribution determination module configured to determine a cell gap distribution across the liquid crystal cell based on the capacitance distribution, the cell gap distribution indicating respective cell gaps of the liquid crystal cell at the different regions; and a compensation voltage derivation module configured to derive, from the cell gap distribution, respective compensation voltages for different data voltages for each of the different regions, the compensation voltages being such that the liquid crystal cell has substantially a same transmittance at the different regions for a same data voltage.

These and other aspects of the present disclosure will be apparent from and elucidated with reference to the embodiment(s) described hereinafter.

DETAILED DESCRIPTION

Figure 1:
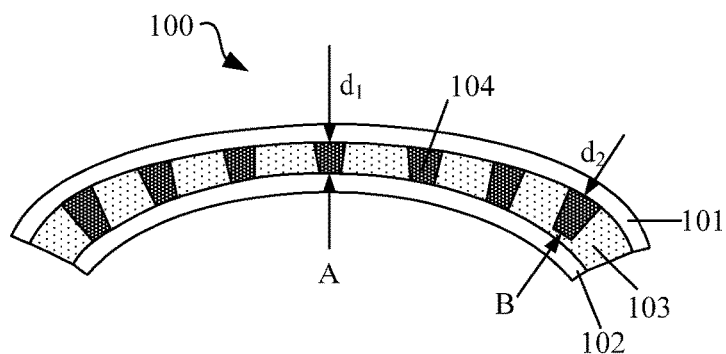
FIG. 1 is a cross-sectional view schematically illustrating a typical curved liquid crystal display panel.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The inventors have realized that non-uniform cell gaps of curved or flexible liquid crystal displays can cause certain display defects, such as non-uniformity in the luminance of white or gray-scale pictures, because the transmittance of the liquid crystal layer is dependent upon the cell gap of the liquid crystal cell. Specifically, in a certain range, the transmittance T can be calculated as follows:

$$T(u) = 1 - \frac{\sin^2(\frac{\pi}{2}\sqrt{1+u^2})}{1+u^2}, \text{ and}$$

$$u = \frac{2d\Delta n}{\lambda},$$

where T represents the transmittance, u represents an intermediate variable, d represents the cell gap, $\Delta n$ represents the difference between the extraordinary refractive index and the ordinary refractive index of the liquid crystal layer, and $\lambda$ represents the wavelength of light.

Based on this recognition, the present disclosure proposes the concept that (1) the capacitances presented at different regions of the liquid crystal cell may indicate respective cell gaps of the liquid crystal cell at the individual regions, and (2) the non-uniformity in the luminance due to the non-uniform cell gaps can be alleviated or even eliminated by compensating for the data voltages supplied to the liquid crystal display panel. As a result, the compensation is such that the liquid crystal cell has substantially the same transmittance for the same data voltage at different regions. Thereby, the luminance uniformity of the liquid crystal display can be improved.

Embodiments of the present disclosure will be described in detail below with reference to the accompanying drawings.

Figure 2A:
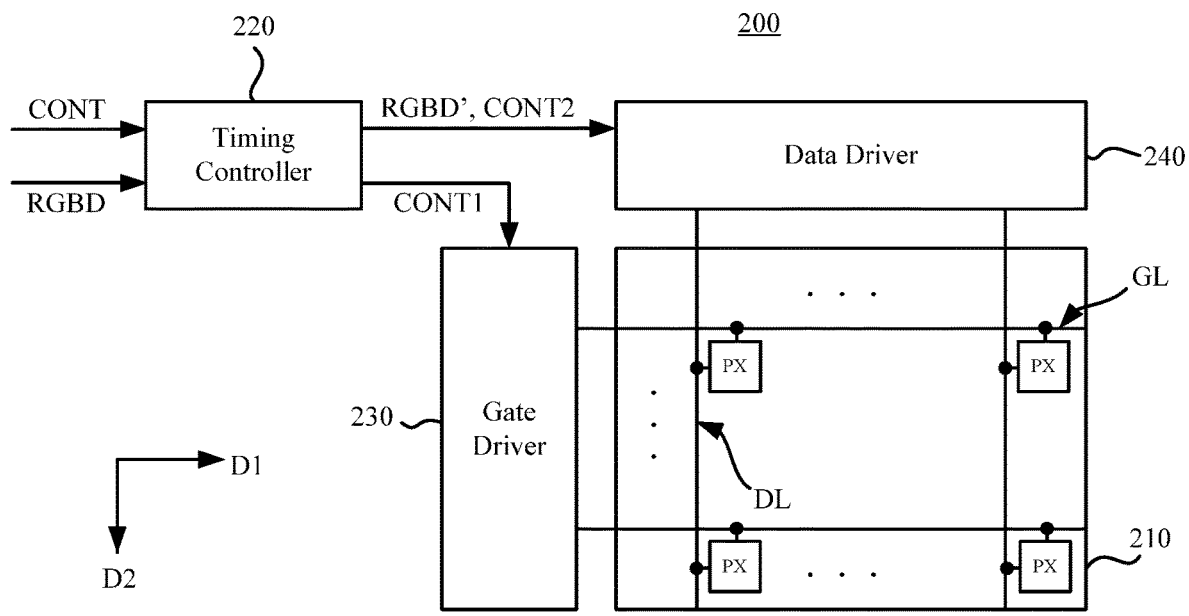
FIG. 2A is a block diagram schematically illustrating a typical liquid crystal display panel.

Referring to FIG. 2A, a typical liquid crystal display 200 includes a display panel 210, a timing controller 220, a gate driver 230, and a data driver 240. The liquid crystal display 200 may take the form of the curved display 100 as shown in FIG. 1 or other flexible liquid crystal display. Alternatively, the liquid crystal display 200 may be a common liquid crystal display having non-uniform cell gaps.

The display panel 210 is connected to a plurality of gate lines GL and a plurality of data lines DL. The gate lines GL extend in a first direction D1, and the data lines DL extend in a second direction D2 intersecting (e.g., substantially perpendicular to) the first direction D1. The display panel 210 includes a plurality of pixels PX arranged in a matrix. Each of the pixels PX is electrically connected to a corresponding one of the gate lines GL and a corresponding one of the data lines DL.

The timing controller 220 controls the operations of the display panel 210, the gate driver 230, and the data driver 400. The timing controller 220 receives input image data RGBD and an input control signal CONT from a system interface. The input image data RGBD includes a plurality of input pixel data for the plurality of pixels. Each input pixel data may include red gradation data R, green gradation data and blue gradation data B for a corresponding one of the plurality of pixels. The input control signal CONT may include a master clock signal, a data enable signal, a vertical synchronization signal, a horizontal synchronization signal, and the like. The timing controller 220 generates output image data RGBD', a first control signal CONT1, and a second control signal CONT2 based on the input image data RGBD and the input control signal CONT. In the case of data voltage compensation, the output image data RGBD' may be compensated image data generated by compensating the input image data RGBD. The output image data RGBD' may include output pixel data for the plurality of pixels. The first control signal CONT1 may include a vertical start signal, a gate clock signal, and the like. The first control signal CONT1 is provided to the gate driver 230 and the driving timing of the gate driver 230 may be controlled based on the first control signal CONT1. The second control signal CONT2 may include a horizontal start signal, a data clock signal, a data load signal, a polarity control signal, and the like. The second control signal CONT2 is provided to the data driver 240 and the driving timing of the data driver 240 may be controlled based on the second control signal CONT2.

The gate driver 230 receives the first control signal CONT1 from the timing controller 220. The gate driver 230 generates a plurality of gate signals for driving the gate lines GL based on the first control signal CONT1. The gate driver 230 may sequentially apply the plurality of gate signals to the gate lines GL.

The data driver 240 receives the second control signal CONT2 and the output image data RGBD' from the timing controller 220. The data driver 240 generates a plurality of analog data voltages based on the second control signal CONT2 and the output image data RGBD'. The data driver 240 may apply the plurality of data voltages to the data line DL.

Figure 2B:
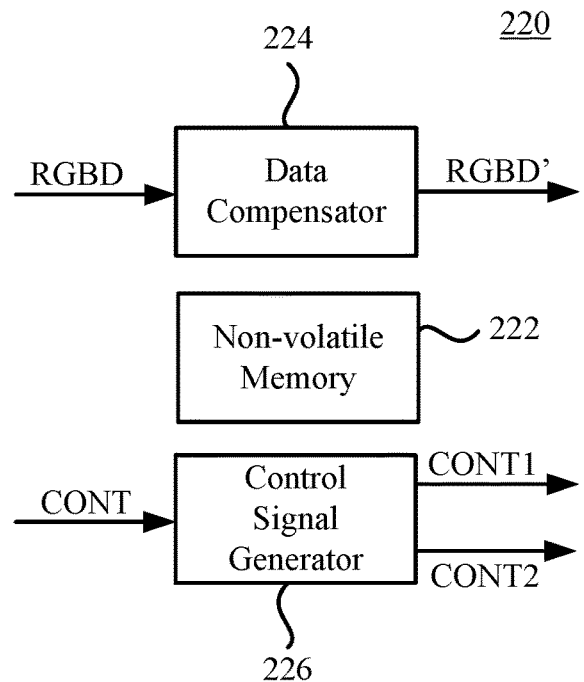
FIG. 2B is a block diagram schematically illustrating a timing controller in the liquid crystal display panel of FIG. 2A.

FIG. 2B schematically illustrates the timing controller 220 in the liquid crystal display panel 200 of FIG. 2A. Referring to FIG. 2B, the timing controller 220 includes a non-volatile memory 222, a data compensator 224, and a control signal generator 226. For convenience of description, the timing controller 220 is shown in FIG. 2B as being divided into three elements, although the timing controller 220 may not be physically divided. Alternatively, the non-volatile memory 222 may be a separate component from timing controller 220.

The non-volatile memory 222, such as a flash memory, a read-only memory (ROM), or an electrically erasable programmable read-only memory (EEPROM), may be accessed by the data compensator 224 and/or the control signal generator 226. The non-volatile memory 222 is used to store programs and/or data required by the timing controller 220 in operation. In the case of data voltage compensation, the non-volatile memory 222 may store various compensation parameters and other data.

The data compensator 224 receives the input image data RGBD from the system interface, and can compensate the input image data RGBD with the compensation parameters retrieved from the non-volatile memory 222 to generate the output image data RGBD'. In addition to the compensation for uneven cell gaps, the data compensator 224 may also perform other compensations, such as, for example, Gamma compensation, adaptive color correction (ACC), and/or dynamic capacitance compensation (DCC).

The control signal generator 226 receives the input control signal CONT from the system interface and generates, based on the input control signal CONT, the first control signal CONT1 for the gate driver 230 of FIG. 2A and the second control signal CONT2 for the data driver 240 of FIG. 2A.

Figure 3:
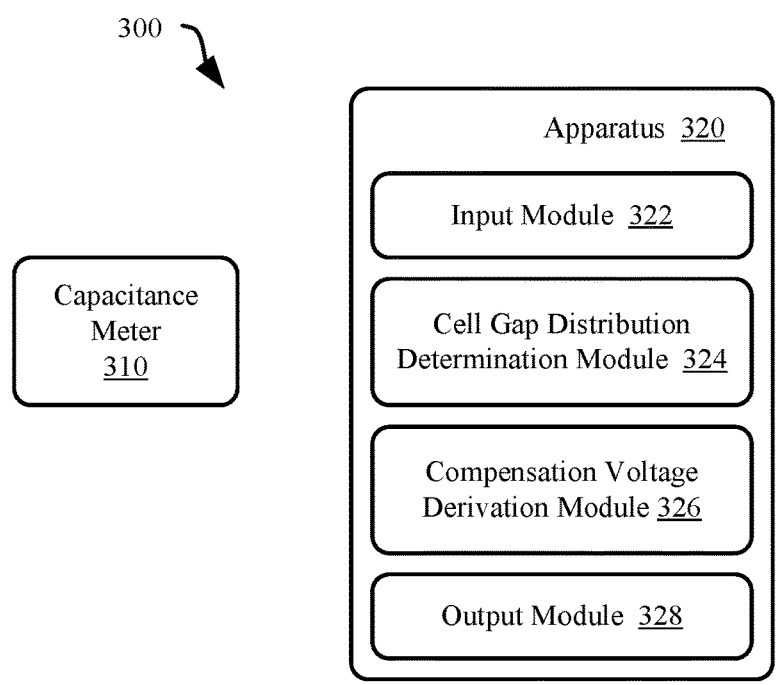
FIG. 3 is a block diagram schematically illustrating a system for compensating data voltages for a liquid crystal display panel according to an embodiment of the present disclosure.

FIG. 3 is a block diagram schematically illustrating a system 300 for compensating data voltages for a liquid crystal display panel according to an embodiment of the present disclosure. The system 300 is used to compensate for data voltages for a liquid crystal display panel (e.g., the curved or flexible LCD 100 as shown in FIG. 1) including a liquid crystal cell having non-uniform cell gaps. Referring to FIG. 3, the system 300 includes a capacitance meter 310 and an apparatus 320 including an input module 322, a cell gap distribution determination module 324, a compensation voltage derivation module 326, and an output module 328.

The capacitance meter 310 is configured to measure a capacitance distribution across the liquid crystal cell. The capacitance distribution indicates respective capacitances presented by the liquid crystal cell at different regions of the liquid crystal cell. The capacitance meter 310 can be a digital multi-meter or any other suitable dedicated capacitance measuring instrument. The measurement of the capacitance can be performed manually. Alternatively, the measurement can be performed automatically by means of the capacitance meter 310 and a specially designed measuring circuit.

An exemplary approach for measuring capacitance is described below in connection with FIGS. 4A and 4B.

Figure 4A:
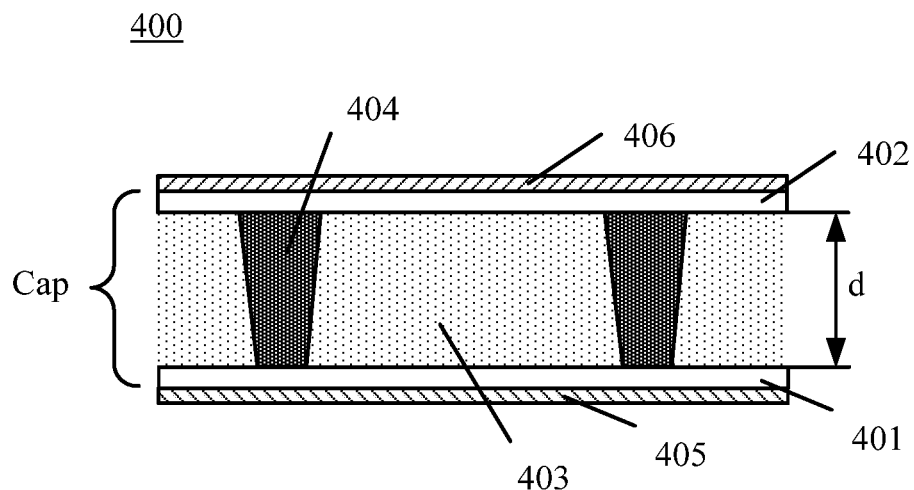
FIG. 4A is a cross-sectional view schematically illustrating a part of a liquid crystal cell.

FIG. 4A is a cross-sectional view schematically illustrating a part of a liquid crystal cell 400. As shown in FIG. 4A, the liquid crystal cell 400 includes a first substrate 401, a second substrate 402 arranged opposite to the first substrate 401, a liquid crystal layer 403 sandwiched between the first and second substrates 401, 402, and a plurality of post spacers 404 extending from the first substrate 401 to the second substrate 402 for supporting the second substrate 402. The shown part of the liquid crystal cell 400 has a cell gap d, which generally refers to the thickness of the liquid crystal layer 403. It will be understood that although not shown, different parts of the liquid crystal cell 400 may have different cell gaps.

In this example, for the purpose of measuring the capacitance, the first substrate 401 is provided with a first electrode block 405 on its first surface (lower surface in FIG. 4A) facing away from the inside of the liquid crystal cell 400, and the second substrate 402 is provided with a second electrode block 406 on its second surface (upper surface in FIG. 4A) facing away from the inside of the liquid crystal cell 400. The first and second electrode blocks 405, 406 are opposite to each other, forming a plate capacitor Cap. It will be understood that although only one first electrode block 405 and one second electrode block 406 are shown in FIG. 4A, a plurality of the first electrode blocks 405 and a plurality of the second electrode blocks 406 may respectively be distributed in an array across the first surface of the first surface 401 and the second surface of the second substrate 402, with the first electrode blocks 405 and the second electrode blocks 406 forming respective plate capacitors at different regions of the liquid crystal cell 400. The capacitance distribution across the liquid crystal cell 400 can be obtained by measuring the capacitances of these plate capacitors. By way of example and not limitation, the array of first electrode blocks 405 and the array of second electrode blocks 406 may have the same pattern, and the first and second electrode blocks 405, 406 are arranged to coincide with each other in a thickness direction of the liquid crystal cell 400. By doing this, the fabrication of the electrode blocks is made simpler, and the resulting plate capacitors more closely resemble their theoretical models.

Figure 4B:
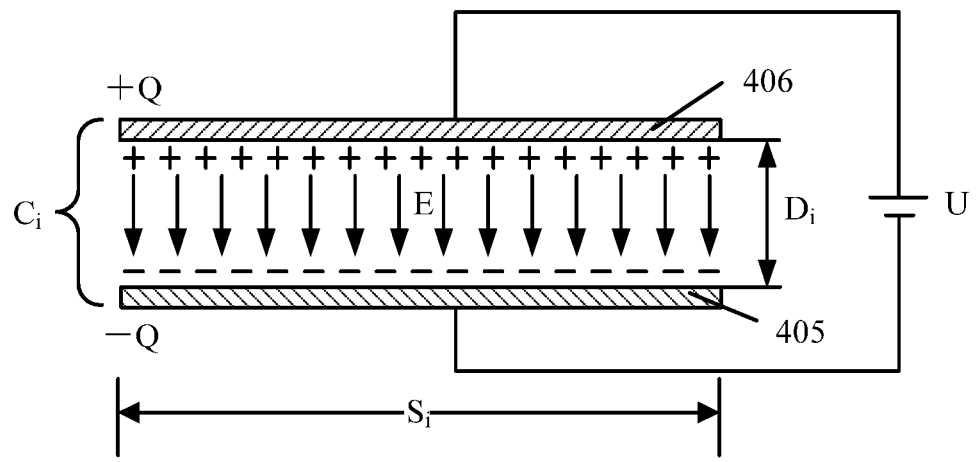
FIG. 4B is a schematic diagram illustrating a principle of capacitance detection for the configuration shown in FIG. 4A.

FIG. 4B is a schematic diagram illustrating a principle of capacitance detection for the configuration shown in FIG. 4A. As shown in FIG. 4B, when a potential difference U is applied between the first and second electrode blocks 405, 406, negative charges (−Q) and an equal number of positive charges (+Q) accumulate on the first electrode block 405 and the second electrode block 406, respectively, establishing an electric field E between the first and second electrode blocks 405, 406. Assuming that the plate capacitor Cap shown in FIG. 4A is a plate capacitor at an i-th (i being a natural number) one of the different regions of the liquid crystal cell 400, the capacitance $C_i$ of the plate capacitor Cap can be expressed as:

$$C_i = \frac{\varepsilon_r S_i}{4\pi k D_i} \quad \text{(Equation 1)}$$

where $\varepsilon_r$ denotes the permittivity, $S_i$ denotes the overlap area of the first and second electrode blocks 405, 406 of the plate capacitor at the i-th region, k denotes the electrostatic force constant, and $D_i$ denotes the distance between the first and second electrode blocks 405 and 406. The capacitances at the different regions of the liquid crystal cell 400 can be measured using the capacitance meter 310, thereby obtaining the capacitance distribution across the liquid crystal cell 400.

It will be understood that the configurations shown in FIGS. 4A and 4B are exemplary and that in other embodiments the capacitance distribution across the liquid crystal cell 400 may be obtained by means of any other appropriate approaches.

Referring back to FIG. 3, the apparatus 320 receives the capacitance distribution measured by the capacitance meter 310. The apparatus 320 may be a variety of different types of devices, such as a desktop computer, a server computer, a laptop or netbook computer, a mobile device, a notepad, and the like. Thus, the apparatus 320 may range from a full resource device with substantial memory and processor resources to a low-resource device with limited memory and/or processing resources.

The input module 322 may be configured to receive the measured capacitance distribution. The capacitance distribution may be received in a variety of different ways, such as by pressing one or more keys of a keypad or keyboard of the apparatus 320, pressing one or more keys of a controller (e.g., a remote control device, a mouse, a trackball, etc.), and/or pressing a specific portion of a touch panel or touch screen of the apparatus 320. The capacitance distribution can also be directly received by the input module 322 in the form of a data stream.

The cell gap distribution determination module 324 may be configured to determine a cell gap distribution across the liquid crystal cell 400 based on the capacitance distribution. Specifically, the cell gap $d_i$ at the i-th region can be calculated from equation (1) as:

$$d_i = \frac{\varepsilon_r S_i}{4\pi k C_i} - d_g,$$

where $d_g$ represents a sum of the thicknesses of the first substrate 401 and the second substrate 402. In the same way, the cell gaps at other regions of the liquid crystal cell 400 can be calculated. Thereby, a cell gap distribution across the liquid crystal cell 400 can be obtained that indicates respective cell gaps of the liquid crystal cell 400 at the different regions.

Figure 5:
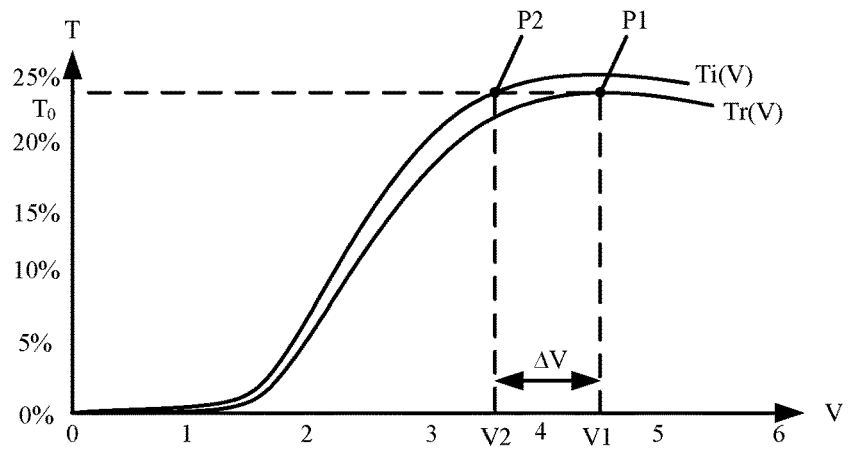
FIG. 5 is a graph illustrating an example functional relationship between transmittance and data voltage at different cell gaps.

The compensation voltage derivation module 326 may be configured to derive respective compensation voltages for different data voltages for each of the different regions based on the cell gap distribution. Specifically, the compensation voltage derivation module 326 may be configured to perform the following operations.

a) Acquire functional relationships between the transmittance and the data voltage at the respective cell gaps. Specifically, FIG. 5 illustrates an example functional relationship between the transmittance T and the data voltage V at different cell gaps, where Tr(V) represents a V-T curve at a minimum cell gap $d_{min}$, and Ti(V) represents a V-T curve at another cell gap $d_i$. The functional relationships at other cell gaps are not shown for clarity of illustration. The functional relationships at the different cell gaps may be obtained by modeling and simulation in advance, and are stored locally at the apparatus 320 or remotely from the apparatus 320.

b) With reference to the functional relationship at a specific one of the respective cell gaps, derive from the functional relationships a data voltage corresponding to a specific transmittance at the specific cell gap and data voltages corresponding to the specific transmittance at remaining ones of the cell gaps. By way of example and not limitation, the functional relationship Tr(V) at the minimum cell gap $d_{min}$ may be selected as a reference. In the example shown in FIG. 5, for a specific transmittance $T_0$ (the maximum value of Tr(V) in this example), point P1 is located on this reference curve Tr(V), and point P2 is located on the curve Ti(V) at the cell gap $d_i$. Then, a data voltage V1 corresponding to the point P1 and a data voltage V2 corresponding to the point P2 can be derived.

c) Calculate respective changes in the data voltages at the remaining cell gaps relative to the data voltage at the specific cell gap as respective compensation voltages for the data voltages at the remaining cell gaps. In the example shown in FIG. 5, since the curve Tr(V) at the minimum cell gap $d_{min}$ is selected as the reference, the compensation voltage for the data voltage V1 at the cell gap $d_i$ is calculated as V2−V1=ΔV (the data voltage V1 at the minimum cell gap $d_{min}$ need not be compensated). When the liquid crystal display panel is in operation, the data voltage V1 supplied to the pixels at a display region having the cell gap $d_i$ will be modified to V2 using the compensation voltage ΔV. In this way, for the same data voltage V1, the transmittance at the display region having the cell gap $d_i$ will be substantially the same as the transmittance at the display region having the minimum cell gap $d_{min}$. As used herein, the phrase "A being substantially the same as B" means that A may be identical to B, or there may be a difference between A and B within a certain range (for example, 10% of the mean value of A and B) with the system errors (e.g., the errors between the simulated V-T curves and the actual situation) being accounted for.

d) Repeat b) and c) to derive respective compensation voltages for the data voltages at the remaining cell gaps for various specific transmittances. In the example shown in FIG. 5, although only one specific transmittance $T_0$ is shown for clarity of illustration, respective compensation voltages for the data voltages at the remaining cell gaps may be derived for other specific transmittances between 0 and $T_0$. As described above, the derived compensation voltages are such that the liquid crystal cell 400 has substantially the same transmittance at the different regions for the same data voltage.

In some embodiments, the compensation voltage derivation module 326 is further configured to establish a lookup table that defines a correspondence between the different regions, the different data voltages, and the derived compensation voltages. The lookup table may be transmitted to the liquid crystal display panel for use by, for example, the timing controller 220 of FIGS. 2A and 2B. For this purpose, the apparatus 320 further includes the output module 328 configured to transmit the look-up table to the liquid crystal display panel, which look-up table can then be stored, for example, in the non-volatile memory 222 of FIG. 2B and retrieved by the timing controller 220 for compensation operation. It will be understood that the compensation voltage mentioned herein is in digital form, which can be directly applied to the input image data (RGBD in the example of FIG. 2B) received by the timing controller to generate the output image data (RGBD' in the example of FIG. 2B). As described earlier with respect to FIG. 2A, the output image data RGBD' is provided to the data driver 240 to be converted into analog data voltages.

Figure 6:
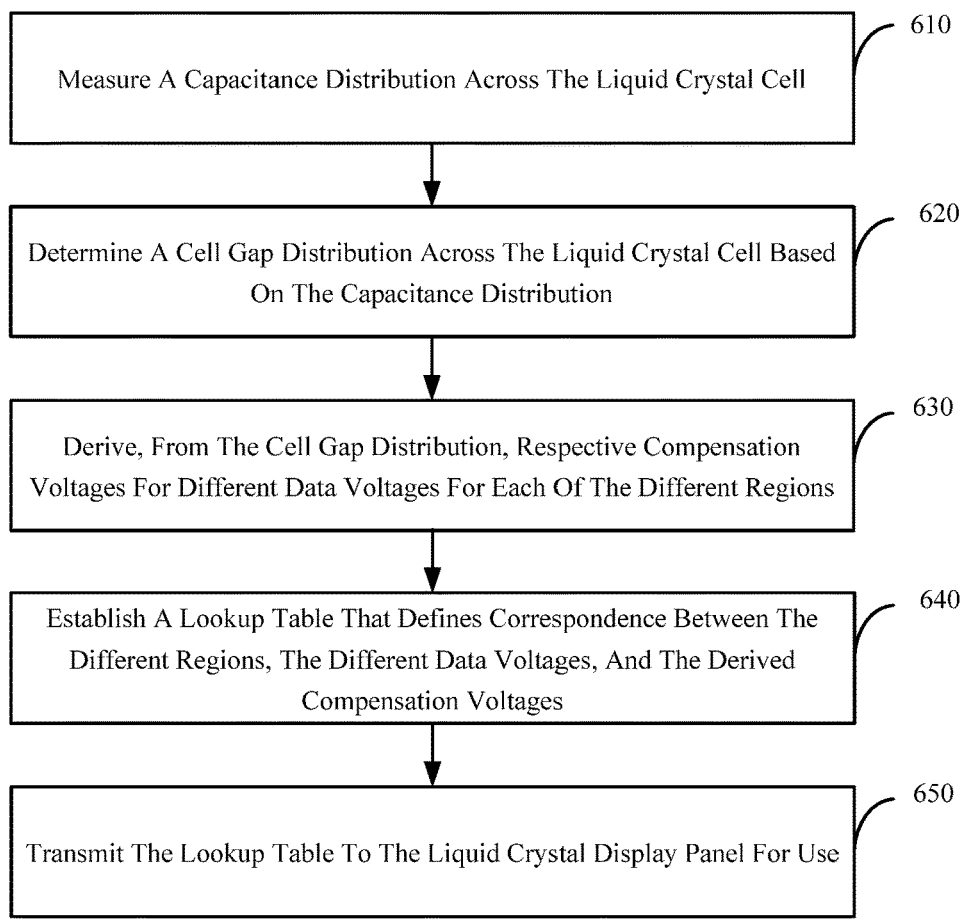
FIG. 6 is a flow chart illustrating a method for determining compensating data voltages for a liquid crystal display panel according to an embodiment of the present disclosure.

FIG. 6 is a flow chart illustrating a method 600 for compensating data voltages for a liquid crystal display panel according to an embodiment of the present disclosure. The method 600 is carried out by a system, such as the system 300 of FIG. 3, and may be implemented in software, firmware, hardware, or a combination thereof.

At step 610, a capacitance distribution across the liquid crystal cell of the liquid crystal display panel is measured. This may be performed by means of the capacitance meter 310 of FIG. 3 in accordance with the approach described above with respect to FIGS. 4A and 4B. Alternatively, step 610 may be performed automatically by means of the capacitance meter 310 and a specially designed measurement circuit. The measured capacitance distribution indicates respective capacitances presented by the liquid crystal cell at different regions of the liquid crystal cell.

At step 620, a cell gap distribution across the liquid crystal cell is determined based on the capacitance distribution. This may be performed by the cell gap distribution determination module 324 described above with respect to FIG. 3. The determined cell gap distribution indicates respective cell gaps of the liquid crystal cell at the different regions.

At step 630, respective compensation voltages for different data voltages for each of the different regions are derived from the cell gap distribution. This may be performed by the compensation voltage derivation module 326 described above with respect to FIG. 3. The derived compensation voltages are such that the liquid crystal cell has substantially the same transmittance at the different regions for the same data voltage.

At step 640, a lookup table is established that defines a correspondence between the different regions, the different data voltages, and the derived compensation voltages. This may be performed by the compensation voltage derivation module 326 described above with respect to FIG. 3. Step 640 may be included in exemplary embodiments.

At step 650, the lookup table is transmitted to the liquid crystal display panel. This may be performed by the output module 328 described above with respect to FIG. 3. As previously described, the lookup table may be stored in the non-volatile memory for use by the timing controller. Step 650 may be included in exemplary embodiments.

Figure 7:
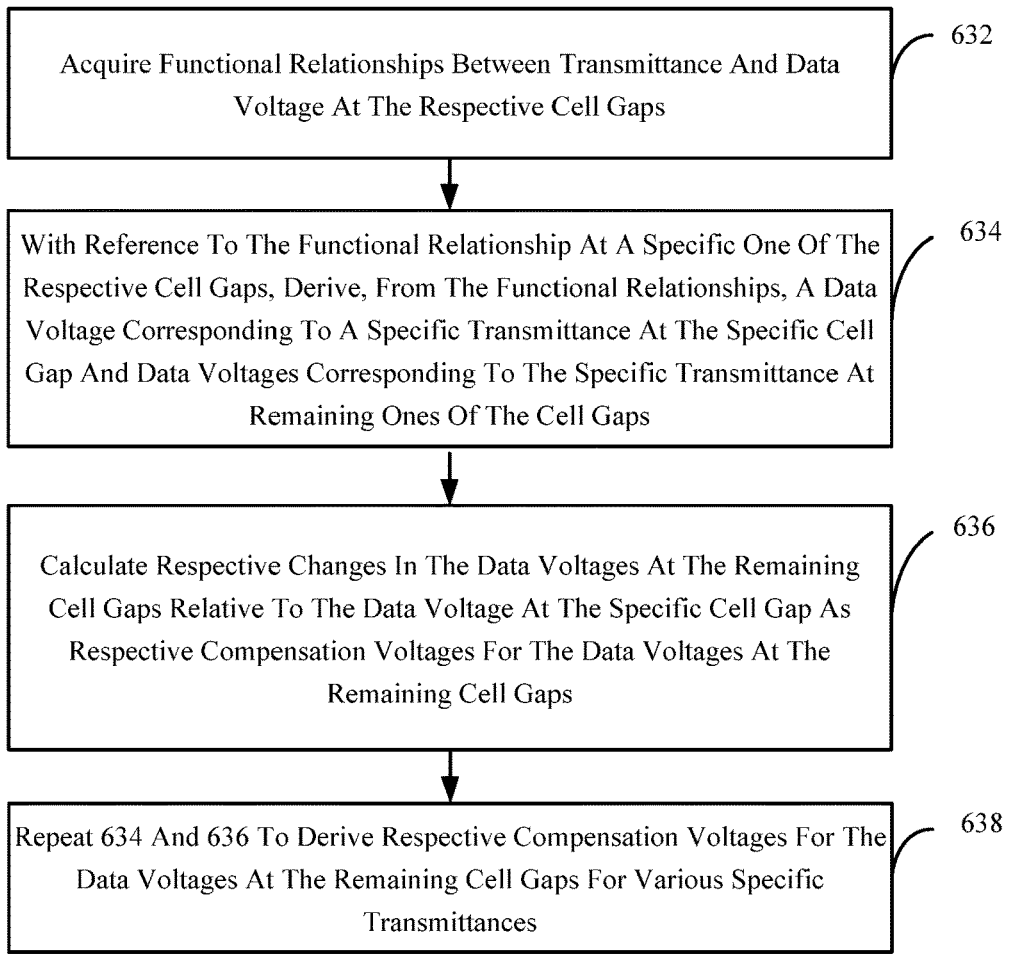
FIG. 7 is a flow chart illustrating an example process of compensation voltage derivation in the method of FIG. 6.

FIG. 7 is a flow chart illustrating an example process of step 630 in method 600.

At step 632, functional relationships between the transmittance and the data voltage for the respective cell gaps are acquired. The functional relationships at different cell gaps can be obtained by modeling and simulation in advance and stored in a suitable storage device for use.

At step 634, a data voltage corresponding to a specific transmittance at a specific one of the respective cell gaps and data voltages corresponding to the specific transmittance at remaining ones of the respective cell gaps are derived from the functional relationships, with reference to the functional relationship at the specific cell gap. In some embodiments, the functional relationship Tr(V) at the minimum cell gap $d_{min}$ may be selected as a reference.

At step 636, respective changes in the data voltages at the remaining cell gaps relative to the data voltage at the specific cell gap is calculated as respective compensation voltages for the data voltages at the remaining cell gaps.

At step 638, steps 634 and 636 are repeated to derive respective compensation voltages for the data voltages at the remaining cell gaps for various specific transmittances. As described above, the derived compensation voltages are such that the liquid crystal cell has substantially the same transmittance at the different regions for the same data voltage.

Figure 8:
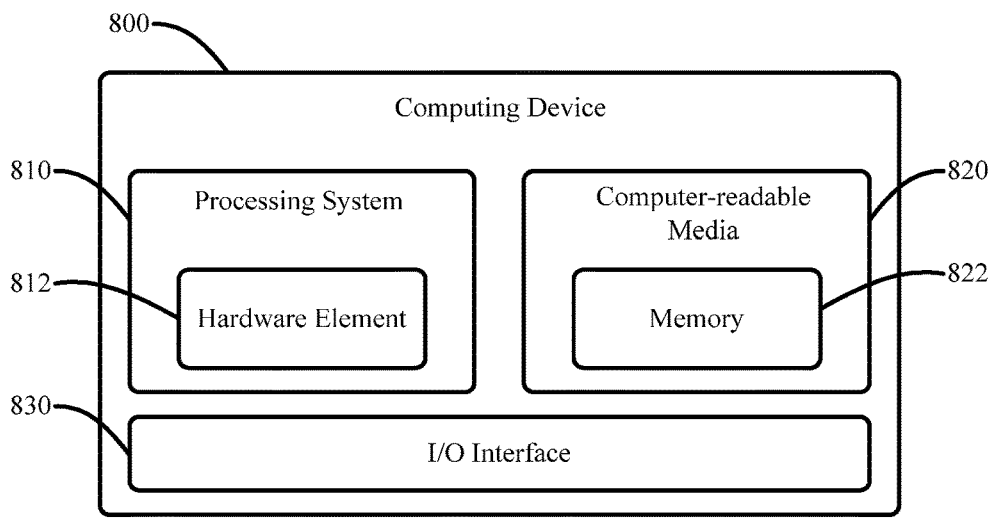
FIG. 8 is a block diagram schematically illustrating a computing device that may implement various techniques described herein.

FIG. 8 is a block diagram that schematically illustrates a computing device 800 that may implement the various techniques described herein. The computing device 800 may be, for example, a personal computer, a mainframe computer, a system-on-a-chip, and/or any other suitable computing device or computing system. The apparatus 320 of FIG. 3 may take the form of the computing device 800.

The example computing device 800 as illustrated includes a processing system 810, one or more computer-readable media 820, and one or more I/O interfaces 830 that are communicatively coupled, one to another. Although not shown, the computing device 800 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures.

The processing system 810 is representative of functionality to perform one or more operations using hardware. Accordingly, the processing system 810 is illustrated as including hardware elements 812 that may be configured as processors, functional blocks, and so forth. This may include implementation in hardware as an application specific integrated circuit or other logic device formed using one or more semiconductors. The hardware elements 812 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 820 is illustrated as including memory 822. The memory 822 represents memory/storage capacity associated with one or more computer-readable media. The memory 822 may include volatile media (such as random access memory (RAM)) and/or non-volatile media (such as read only memory (ROM), Flash memory, optical disks, magnetic disks, and so forth). The memory 822 may include fixed media (e.g., RAM, ROM, a fixed hard drive, and so on) as well as removable media (e.g., Flash memory, a removable hard drive, an optical disc, and so forth). The computer-readable media 820 may be configured in a variety of other ways as further described below.

The one or more input/output interface(s) 830 are representative of functionality to allow a user to enter commands and information to computing device 800, and also allow data to be transmitted to other components or devices using various input/output devices. Examples of the input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of the output devices include a serial interface, a universal serial bus (USB) interface, a network interface, a FireWire interface, and so forth. Thus, the computing device 800 may be configured in a variety of ways as further described below to support user and/or data interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 800. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 800, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 812 and computer-readable media 820 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 812. The computing device 800 may be configured to implement particular instructions and/or functions corresponding to the software and/or hardware modules. Accordingly, implementation of modules as a module that is executable by the computing device 800 as software may be achieved at least partially in hardware, e.g., through use of computer-readable storage media and/or hardware elements 812 of the processing system. The instructions and/or functions may be executable/operable by one or more articles of manufacture (for example, one or more computing devices 800 and/or processing systems 810) to implement techniques, modules, and examples described herein.

The techniques described herein are not limited to the specific examples described herein. For example, various modules in the apparatus 320 of FIG. 3 may also be implemented using a distributed system in which the functions may partially reside on the computing device 800 and partially reside on a cloud device.

Various modifications and variations to the described embodiments can be made by those skilled in the art without departing from the scope of the present disclosure. Thus, to the extent such modifications and variations fall within the scope of the appended claims and equivalents thereof, the present disclosure is also intended to encompass these modifications and variations.

What is claimed is:

1. A method for determining compensating data voltages for a liquid crystal display panel, wherein the liquid crystal display panel comprises a liquid crystal cell defined by a first substrate and a second substrate arranged opposite to each other, the liquid crystal cell having non-uniform cell gaps across the liquid crystal cell, and the method comprises:

measuring a capacitance distribution across the liquid crystal cell, the capacitance distribution indicating respective capacitances presented by the liquid crystal cell at different regions of the liquid crystal cell;

determining a cell gap distribution across the liquid crystal cell based on the capacitance distribution, wherein the cell gap distribution indicates respective cell gaps of the liquid crystal cell at the different regions; and deriving, from the cell gap distribution respective compensation voltages for different data voltages for each of the different regions, wherein the compensation voltages are such that the liquid crystal cell has substantially a same transmittance at the different regions for a same data voltage, wherein the deriving the compensation voltages comprises:
a) acquiring functional relationships between the transmittance and the data voltage at the respective cell gaps;
b) with reference to the functional relationship at a specific one of the respective cell gaps, deriving from the functional relationships a data voltage corresponding to a specific transmittance at the specific cell gap and data voltages corresponding to the specific transmittance at remaining ones of the cell gaps;
c) calculating respective changes in the data voltages at the remaining cell gaps relative to the data voltage at the specific cell gap as respective compensation voltages for the data voltages at the remaining cell gaps; and
d) repeating b) and c) to derive respective compensation voltages for the data voltages at the remaining cell gaps for various specific transmittances;

wherein the measuring comprises:
arranging an array of first electrode blocks across a first surface of the first substrate, wherein the first surface is facing away from inside of the liquid crystal cell;
arranging an array of second electrode blocks across a second surface of the second substrate, wherein the second surface is facing away from the inside of the liquid crystal cell, and each first electrode block is opposite to a second electrode block to form a respective plate capacitor; and
measuring capacitances of respective plate capacitors at different regions to obtain the capacitance distribution.

2. The method of claim 1, wherein the array of first electrode blocks and the array of second electrode blocks have a same pattern, and wherein the first and second electrode blocks are arranged to coincide with each other in a thickness direction of the liquid crystal cell.

3. The method of 1, wherein the determining the cell gap distribution comprises determining the respective cell gaps at the different regions from the following equation:

$$d_i = \frac{\varepsilon_r S_i}{4\pi k C_i} - d_g,$$

where $d_i$ represents the cell gap at an i-th one of the regions, i is a natural number, $\varepsilon_r$ represents a permittivity, $S_i$ represents an overlap area of the first and second electrode blocks of the plate capacitor at the i-th region, k represents an electrostatic force constant, $C_i$ represents a capacitance of the plate capacitor at the i-th region, and $d_g$ represents a sum of thicknesses of the first and second substrates.

4. The method of claim 1, wherein the specific cell gap is a smallest one of the respective cell gaps.

5. The method of claim 1, further comprising establishing a lookup table that defines a correspondence between the different regions, the different data voltages, and the derived compensation voltages.

6. The method of claim 5, further comprising transmitting the lookup table to the liquid crystal display panel for use.

7. An apparatus for determining compensating data voltages for a liquid crystal display panel, the liquid crystal display panel comprising a liquid crystal cell defined by a first substrate and a second substrate arranged opposite to each other, the liquid crystal cell having non-uniform cell gaps across the liquid crystal cell, the device comprising:
an input module configured to receive a capacitance distribution across the liquid crystal cell, the capacitance distribution indicating respective capacitances presented by the liquid crystal cell at different regions of the liquid crystal cell;
a cell gap distribution determination module configured to determine a cell gap distribution across the liquid crystal cell based on the capacitance distribution, the cell gap distribution indicating respective cell gaps of the liquid crystal cell at the different regions; and
a compensation voltage derivation module configured to derive, from the cell gap distribution, respective compensation voltages for different data voltages for each of the different regions, the compensation voltages being such that the liquid crystal cell has substantially a same transmittance at the different regions for a same data voltage,
wherein the compensation voltage derivation module is further configured to:
a) acquire functional relationships between the transmittance and the data voltage at the respective cell gaps;
b) with reference to the functional relationship at a specific one of the respective cell gaps, derive from the functional relationships a data voltage corresponding to a specific transmittance at the specific cell gap and data voltages corresponding to the specific transmittance at remaining ones of the cell gaps;
c) calculate respective changes in the data voltages at the remaining cell gaps relative to the data voltage at the specific cell gap as respective compensation voltages for the data voltages at the remaining cell gaps; and
d) repeat b) and c) to derive respective compensation voltages for the data voltages at the remaining cell gaps for various specific transmittances;
wherein the liquid crystal display panel comprises an array of first electrode blocks arranged across a first surface of the first substrate and an array of second electrode blocks arranged across a second surface of the second substrate, wherein the first surface and the second surface are facing away from the inside of the liquid crystal cell, each first electrode block is opposite to a second electrode block to form a respective plate capacitor, and the capacitance distribution is obtained by measuring capacitances of respective plate capacitors at different regions.

8. The apparatus of claim 7, wherein the cell gap distribution determination module is further configured to determine the respective cell gaps at the different regions from the following equation:

$$d_i = \frac{\varepsilon_r S_i}{4\pi k C_i} - d_g,$$

where $d_1$ represents the cell gap at an i-th one of the regions, i is a natural number, $\varepsilon_r$ represents a permittivity, $S_i$ represents an overlap area of the first and second electrode blocks of the plate capacitor at an i-th region, k represents an electrostatic force constant, $C_i$ represents the capacitance of the plate capacitor at the i-th region, and $d_g$ represents a sum of thicknesses of the first and second substrates.

9. The apparatus of claim 7, wherein the specific cell gap is a smallest one of the respective cell gaps.

10. The apparatus of claim 7, wherein the compensation voltage derivation module is further configured to establish a lookup table that defines a correspondence between the different regions, the different data voltages, and the derived compensation voltages.

11. The apparatus of claim 10, wherein the liquid crystal display panel further comprises a timing controller configured to compensate the data voltages using the derived compensation voltages and a non-volatile memory accessible by the timing controller, and wherein the apparatus further comprises an output module configured to transmit the lookup table to the non-volatile memory for use by the timing controller.

12. A system for compensating data voltages for a liquid crystal display panel, the liquid crystal display panel comprising a liquid crystal cell defined by a first substrate and a second substrate arranged opposite to each other, the liquid crystal cell having non-uniform cell gaps across the liquid crystal cell, the system comprising:
- a capacitance meter configured to measure a capacitance distribution across the liquid crystal cell, the capacitance distribution indicating respective capacitances presented by the liquid crystal cell at different regions of the liquid crystal cell; and
- an apparatus comprising:
  - an input module configured to receive the capacitance distribution;
  - a cell gap distribution determination module configured to determine a cell gap distribution across the liquid crystal cell based on the capacitance distribution, the cell gap distribution indicating respective cell gaps of the liquid crystal cell at the different regions; and
  - a compensation voltage derivation module configured to derive, from the cell gap distribution, respective compensation voltages for different data voltages for each of the different regions, the compensation voltages being such that the liquid crystal cell has substantially a same transmittance at the different regions for a same data voltage,
  - wherein the compensation voltage derivation module is further configured to:
    - a) acquire functional relationships between the transmittance and the data voltage at the respective cell gaps;
    - b) with reference to the functional relationship at a specific one of the respective cell gaps, derive from the functional relationships a data voltage corresponding to a specific transmittance at the specific cell gap and data voltages corresponding to the specific transmittance at remaining ones of the cell gaps;
    - c) calculate respective changes in the data voltages at the remaining cell gaps relative to the data voltage at the specific cell gap as respective compensation voltages for the data voltages at the remaining cell gaps; and
    - d) repeat b) and c) to derive respective compensation voltages for the data voltages at the remaining cell gaps for various specific transmittances;
  - wherein the liquid crystal display panel comprises an array of first electrode blocks arranged across a first surface of the first substrate and an array of second electrode blocks arranged across a second surface of the second substrate, wherein the first surface and the second surface are facing away from the inside of the liquid crystal cell, each first electrode block is opposite to a second electrode block to form a respective plate capacitor, and the capacitance meter is configured to measure capacitances of respective plate capacitors at different regions.

13. The system of claim 12, wherein the cell gap distribution determination module is further configured to determine the respective cell gaps at the different regions from the following equation:

$$d_i = \frac{\varepsilon_r S_i}{4\pi k C_i} - d_g,$$

where $d_1$ represents the cell gap at an i-th one of the regions, i is a natural number, $\varepsilon_r$ represents a permittivity, $S_i$ represents an overlap area of the first and second electrode blocks of the plate capacitor at an i-th region, k represents an electrostatic force constant, $C_i$ represents the capacitance of the plate capacitor at the i-th region, and $d_g$ represents a sum of thicknesses of the first and second substrates.

14. The system of claim 12, wherein the specific cell gap is a smallest one of the respective cell gaps.

15. The system of claim 12, wherein the compensation voltage derivation module is further configured to establish a lookup table that defines a correspondence between the different regions, the different data voltages, and the derived compensation voltages.

16. The system of claim 15, wherein the liquid crystal display panel further comprises a timing controller configured to compensate the data voltages with the derived compensation voltages and a non-volatile memory accessible by the timing controller, and wherein the apparatus further comprises an output module configured to transmit the lookup table to the non-volatile memory for use by the timing controller.

* * * * *